(12) United States Patent
Farag et al.

(10) Patent No.: US 11,080,661 B2
(45) Date of Patent: Aug. 3, 2021

(54) AUTOMATED TESTING OF UTILITY INFRASTRUCTURE ASSETS

(71) Applicant: NortecView Ltd., Kfar Saba Industrial Zone (IL)

(72) Inventors: Alicia M. Farag, Arlington Heights, IL (US); Justin M. Beynon, Chicago, IL (US); Shahar Levi, Herzliya (IL); Michael Levi, Yavne (IL)

(73) Assignee: NortecView Ltd., Kfar Saba Industrial Zone (IL)

( * ) Notice: Subject to any disclaimer, the term of this patent is extended or adjusted under 35 U.S.C. 154(b) by 518 days.

(21) Appl. No.: 16/179,594

(22) Filed: Nov. 2, 2018

(65) Prior Publication Data

US 2020/0143331 A1    May 7, 2020

(51) Int. Cl.
| | |
|---|---|
| *G06Q 10/00* | (2012.01) |
| *G06Q 10/06* | (2012.01) |
| *G06Q 50/06* | (2012.01) |
| *H04W 4/38* | (2018.01) |
| *G01D 5/00* | (2006.01) |
| *G06Q 30/00* | (2012.01) |
| *G07C 3/08* | (2006.01) |

(52) U.S. Cl.
CPC .............. *G06Q 10/20* (2013.01); *G01D 5/00* (2013.01); *G06Q 10/06315* (2013.01); *G06Q 30/018* (2013.01); *G06Q 50/06* (2013.01); *G07C 3/08* (2013.01); *H04W 4/38* (2018.02)

(58) Field of Classification Search
CPC ............. G06Q 10/20; G06Q 10/06315; G06Q 30/018; G06Q 50/06; H04W 4/38; G01D 5/00; G07C 3/08
USPC ......................................................... 702/176
See application file for complete search history.

(56) References Cited

U.S. PATENT DOCUMENTS

| | | |
|---|---|---|
| 7,835,893 B2 | 11/2010 | Cullick et al. |
| 8,510,147 B2 | 8/2013 | Mitra et al. |
| 8,548,756 B1 | 10/2013 | Foley |
| 8,548,757 B1 | 10/2013 | Foley |
| 8,548,758 B1 | 10/2013 | Foley |
| 9,471,819 B2 | 10/2016 | Tucker et al. |
| 9,836,629 B2 | 12/2017 | Tucker et al. |
| 9,915,128 B2 | 3/2018 | Hunter |
| 2001/0047283 A1 | 11/2001 | Melick |
| 2004/0051368 A1 | 3/2004 | Caputo |

(Continued)

FOREIGN PATENT DOCUMENTS

WO    WO2013120209 A1    8/2013

OTHER PUBLICATIONS

"Compliance Management System, TaskOp", RCP, 2018, 2 pages.

(Continued)

*Primary Examiner* — Ly D Pham
(74) *Attorney, Agent, or Firm* — Lempia Summerfield Katz LLC

(57) ABSTRACT

The disclosed embodiments relate to systems and methods for creating a test record for a utility infrastructure including a plurality of interconnected components which convey a deliverable from at least one source to at least one destination. The computer implemented method may include a testing device that creates and monitors a test to create a test record. The test record may be stored in a database for access by other devices and/or users. The disclosed embodiments enable a testing device to provide accurate and convenient test records for the plurality of interconnected components.

30 Claims, 6 Drawing Sheets

(56) References Cited

U.S. PATENT DOCUMENTS

| | | |
|---|---|---|
| 2007/0226487 A1 | 9/2007 | Li |
| 2009/0307763 A1 | 12/2009 | Rawlins et al. |
| 2011/0270525 A1 | 11/2011 | Hunter |
| 2013/0338833 A1 | 12/2013 | Medina et al. |
| 2016/0377232 A1 | 12/2016 | Boker et al. |

OTHER PUBLICATIONS

"Maximum Allowable Operating Pressure (MAOP), MaxOp", RCP, 2018, 2 pages.
"Pipeline Pressure Test Services, TestOp", RCP, 2018, 2 pages.
Bob Morris, GTI's Tracking and Traceability Technologies with LocusView Solutions, GTI, Aug. 2015, 26 pages.
Jennifer Zaino, "Ground Control, Gas, Electric and Water Companies Slowly Adopt RFID to Reduce Costs and Improve Services", RFID Journal, Mar./Apr. 2016, 7 pages.
Mark et al., "Asset Tracking and Traceability: Field-to-GIS Solution", Pipeline & Gas Journal, Oct. 2017, 4 pages, vol. 244, No. 10.
Sheri Baucom, TestOp, Client Success Story—2017, RCP, 13 pages.
TestOp, RCP, 2018, 5 pages, http://www.rcp.com/testop.html.
Title 49, Code of Federal Regulations, Part 192—Transportation of Natural and Other Gas by Pipeline: Minimum Federal Safety Standards. Subpart J—Test Requirements, 10-1-10 Edition, pp. 84-87, GPO.
Tucker et al, "The Freedom of Integrity Management", World Pipelines, Jan. 2013, 42 pages.

AUTOMATED TESTING OF UTILITY INFRASTRUCTURE ASSETS

BACKGROUND

Utility infrastructures, i.e., the collective means for distributing (or collecting) a service/deliverable provided thereby, may utilize many utility infrastructure assets for conveying and delivering the service/deliverables, such as electric power, telephone service, water, sewer, natural gas, and/or other electrical signals, liquids, gasses, and/or solids, through transmission, conveyance and/or distribution, to the end destination/consumer. These infrastructure assets may include storage mechanisms/devices, pipes, electrical cables, fiber-optic cables, conduits, valves, junctions, relays, breakers, etc. and other devices or mechanisms which, in combination, enable the utility to effect and manage conveyance and delivery. Typically, the utility infrastructure is subdivided, such as by geographic region, each subdivision comprising a subset of the utility infrastructure. Such utility infrastructure assets, which are often installed above and/or below ground over a wide geographic area, need to be located and tested, e.g. for safety and/or loss prevention, during and after installation or repair/replacement. In order to conduct such a test, test parameters need to be determined. And once the test is completed, the results of the test, according to the test parameters, need to be evaluated, documented and verified.

As a utility's infrastructure increases in intricacy and size/scale, so too does the complexity of ensuring all of the assets thereof are adequately and properly tested and the results thereof suitably documented, e.g. the amount of data used/collected in connection with testing of the assets thereof increases with the size/scale. Reliability of this data may be very important. For example, it may be necessary to monitor and document the test results of the infrastructure assets, such as structural testing, pressure testing, temperature testing, etc., such as for satisfying regulatory requirements. Furthermore, in order to verify that the integrity of the utility infrastructure assets meets the requirements of a manufacturer, client, and/or a government agency, the infrastructure assets need to be tested according to particular test parameters. Such test parameters may be determined according to government regulations, industry standards, engineering calculations, and/or a company policy or other basis or combination thereof. Given the scale of a given utility infrastructure, i.e. the number of assets used to implement it, the infrastructure assets may need to be verified to account for which assets have been tested or not tested in order to ensure the entire infrastructure, or specified portion thereof, has been completely reviewed.

One known method for collection of this data is to manually conduct tests and collect and document the results thereof. Essentially, a user, such as a utility employee, manually implements all aspects of a test according to written test parameters developed, for example, by the utility's engineering staff. The test parameters are retrieved from a written specification, a database or determined by the user, such as through an engineering calculation. The user implements, monitors and tracks the test and ultimately manually documents results of the test. The documentation can include paper records or electronic databases populated by the user. However, this method is error prone and slow. For example, the user implementing the test and recording the data therefrom may intentionally or unintentionally enter inaccurate test results, incorrectly document which infrastructure assets have been tested, accidentally perform the test using incorrect parameters, and/or fail to monitor the test and collect the entire or actual results. For example, the user may document 100 psi when the test was only performed at 90 psi, the user may document that the test was performed on the main and the service line when the test was only performed on the service line, the user may think that the test should be performed at 60 psi but it should actually be performed at 100 psi based on a new company procedure, and/or the user be distracted or leave the site during the test and fail to monitor the pressure gauge, thereby missing a potential anomalous, or intermittent result.

Accordingly, some services have attempted to automate data collection and documentation. For example, a method known in the art for testing and certification of well equipment devices includes identifying a selected device, a test specification, and testing sequences to be performed by a corresponding testing apparatus. The selected device is identified from a device identifier received from a user input or user scan of an RFID tag. Testing sequences are matched by a testing module responsive to the selected device by retrieving the testing sequences from a database. The test sequences are displayed to the user. The user selects a test sequence to be performed. The testing apparatus is controlled by the testing module and/or the user for the selected testing sequence so that the corresponding testing apparatus performs the sequence responsive to the test specification. Testing data from the testing apparatus is generated for the selected testing sequence. The testing data for the selected testing sequence is linked to the device identifier for the device so that a certificate can be generated by a certification module. The generated certificate is linked for the selected well equipment device to the device identifier for the selected device in a database. While this method automatically records and documents test result data, this method allows for human error in the selection of the device and/or testing sequence. Accordingly, this method does not prevent the wrong utility infrastructure assets from being tested or prevent incorrect test parameters from being applied.

Another solution to automate data collection and documentation includes capturing, organizing and retrieving data for utility assets using RFID tags. For example, a method known in the art stores data related to a plurality of utility assets in a database, where the stored data includes data about the type of the utility asset, repair, documentation, testing validation, and inspection of the utility asset, programs a plurality of RFID tags for placement on a utility asset, by one or more processors, and places the programmed RFID tags on the utility asset. The programmed tags are linked to stored data related to the utility asset, including location data of the placed RFID tags. One or more of the placed RFID tags are queried to retrieve data about the utility asset, including data about the location of the utility asset, the type of the utility asset, repair, documentation, testing validation, and inspection of the utility asset. While this method automates the organization of data, it requires users to place and scan RFID tags, enter information, and determine test parameters. Accordingly, this method does not prevent inaccurate information from being entered or the wrong assets from being tested. In addition, this method does not prevent the use of incorrect test parameters.

Another solution to automate data collection and documentation includes a mobile-enabled data management system for the storage and manipulation of inspection attributes of piping components and piping installations. For example, a method known in the art captures and tracks the details of various inspection attributes related to the piping components and connections in a piping installation. Inspection attributes and other parameters of components in the piping installation, as well as the connections therebetween, can be stored in a database. Inspection attributes, including the results of non-destructive testing of components or connections, as well as the results of in person personnel examination of components or connections in the piping installation, are entered into the database by a user using varying types of mobile devices. The method also includes acceptable inspection parameters stored in a database. The acceptable parameters are compared to the inspection attributes. A notification is generated if the inspection attribute is outside the inspection parameter. While this method automates the organization of data, it requires users to enter information and determine test parameters. Accordingly, this method does not prevent inaccurate information from being entered or the wrong assets from being tested. In addition, this method does not prevent the use of incorrect test parameters.

Another solution to automate data collection and documentation includes a method for creating geographic information system (GIS) features and populating a GIS feature attribute with information obtained from a barcode or similar identifier. The method includes scanning a code on a component to be installed or repaired, converting the code into attributes that describe the component, obtaining additional characteristics of the components, associating the component with a location of installation, and placing the geometric feature onto the GIS map. Characteristics include a component manufacturer, a manufacture lot number, a production date, a component material, a component dimension or size, and other information. While this method automates data collection and documentation of location data, it does not prevent wrong assets from being tested or prevent the use of incorrect test parameters.

As can be seen, the methods described above may be error prone due to human intervention, which may cause unreliable information and increased support costs for the businesses operating the software system due to necessary auditing systems. Accordingly, such systems need to provide a convenient way to provide accurate automated testing of utility infrastructure assets with as little human intervention as possible.

DETAILED DESCRIPTION

Figure 1A:
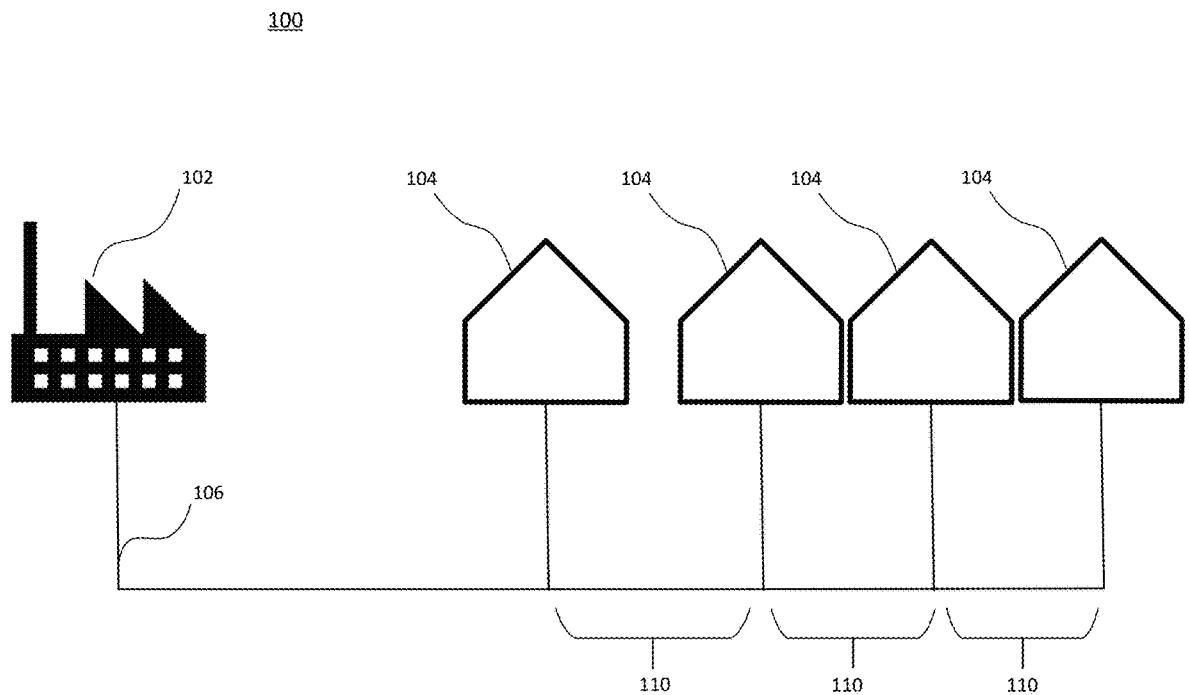
FIG. 1A depicts an example utility infrastructure.

The disclosed embodiments generally relate to automated testing, e.g. specifying/testing/validating/documenting, of a system, or a subset thereof, that provides or collects a service/deliverable via an infrastructure. The infrastructure, such as a utility infrastructure, generates and/or stores and/ or, conducts and/or or conveys the deliverable from a source to the delivery destination. The deliverable, e.g. electricity, natural gas, water, sewage, telephone, internet, etc., is conveyed from, through, and/or to a plurality of interconnected components, referred to herein as infrastructure assets, e.g. pipes, electrical cables, fiber-optic cables, conduits, valves, junctions, relays, breakers, intermediate storage (e.g. storage tank, well etc.), etc., or combinations thereof, from a source that originates, i.e. supplies/manufacturers/carries the deliverable, e.g. a delivery company/agency, a storage facility, a power plant, etc., to a destination that receives the deliverable or otherwise where the deliverable is stored, processed and/or consumed, e.g. a home, a store, a manufacturing facility, etc.

The disclosed embodiments address and specifically solve a technological problem that uniquely arises in the field of utility infrastructure testing, where a testing specification needs to be determined and a record documenting the testing of the infrastructure, or portion thereof, needs to be created and associated with assets accurately. Thus, the disclosed solution is rooted in computer technology in order to overcome a problem specifically arising in testing of utility infrastructure assets. Indeed, the subject technology improves the functioning of the computer implemented testing system by allowing it to automatically create a specification of a test, create a test record of the test, and associate the test record to the correct assets more easily and more accurately.

The disclosed embodiments utilize a testing device to implement the automated testing of one or more of the infrastructure assets as described below. As used herein, the testing device refers to a device that may be operated by a field employee to automatically create a specification of a test, execute/implement the test according to the created specification, and/or automatically create the test record of the test. In one embodiment, the testing device may include one or more of a desktop or laptop computer, a mobile device such as a mobile phone or a tablet device or the like, may execute instances of one or more particular computer software programs, each referred to as an "app" that is/are specifically programmed to provide, enable, or facilitate the functionality described herein. Each installation of the app on a particular device may be referred to as an "instance" of the app. The app may be implemented as a stand-alone program separately executed by the device from another program executed/executable by the device or may be a program, such as an html5 or "web app", executed or implemented by another program on the device, e.g. a web browser program.

More particularly, the disclosed embodiments relate to a system/process for automatic creation of a specification of a test, execution/implementation of that test according to the specification and automatic creation of a test record documenting the result thereof, e.g. set of data regarding the tested infrastructure assets, such as a part/serial number of tested asset, a pass/fail designation, test data/results, test procedures and test parameters used, and/or an identity of a user/entity performing the test, which enables the supplier/ manufacturer/carrier of the deliverable to test the infrastructure assets with minimal human intervention and opportunities for error introduced thereby, e.g. the field employee entering incorrect test results and/or assets tested, performing the wrong test, and/or failing to monitor the test and collect the actual test results.

For example, in one embodiment, the testing device receives data indicative of a specification of a test goal or an end result of a test, e.g. a work order or other specification including requirements of a manufacturer, a client, and/or a government agency, such as a specification for a Maximum Allowable Operating Pressure (MAOP), for the infrastructure assets. For example, with respect to infrastructure assets used for the delivery of natural gas, the MAOP is a factor in determining what pressure the test should be performed at according to federal regulations (see, 49 CFR Part 192, Subpart J). The portion of the infrastructure assets to be tested are determined, e.g. from the work order based on the engineering design and/or the user operating the testing device, and, typically, form a closed subset of the overall infrastructure for the purpose of controlling the conditions under which the test is performed, i.e. a portion that is, or is capable of being, sealed off, isolated or otherwise is, or is capable of being made, leak-proof, from the rest of the infrastructure utility system, e.g. a sealed off (by valves) section of gas or liquid pipes, electrically isolated or insulated in the case of electronic conduits, etc. The testing device determines test requirements, static attributes, and dynamic attributes associated with the determined subset, as will be discussed below.

The infrastructure assets to be tested are mapped, such as physically/geographically, e.g. physically visiting each asset, point and/or boundary of the subset of infrastructure assets to be tested using, for example, a GPS enabled device, e.g. incorporated into the testing device, to document the geographic location of the asset(s) in connection with information about the particular asset of the subset located at that location such as by additionally scanning, e.g. with the testing device, a barcode containing or relating to material property information of the infrastructure asset at the location to be tested. Alternatively, or in addition thereto, the infrastructure assets may be mapped logically, e.g., identifying each asset of the subset, such as by scanning a barcode located thereon, as well as the relationship of each asset to the other assets of the subset, such as by identifying which assets are directly connected with other assets or otherwise located proximate thereto. It will be appreciated that the infrastructure assets may have been previously mapped, e.g. at the time of construction, during a previous repair or previous testing. Accordingly, mapping the infrastructure assets, as discussed herein, may refer to retrieving, and optionally validating, a previously created/pre-existing mapping which may cover additional infrastructure assets which are not to be tested. The mapping allows for identification of at least those infrastructure assets of the closed subset to be tested such that the test record may be associated with the infrastructure assets.

Test parameters, e.g. a set of physical properties and values/test data thereof, specifying the attributes of the assets to be tested and the acceptable values/test data which should be measured or observed, as well as the test procedures, e.g. the steps to perform manually, such as by the user, and/or programmatically/autonomously, such as by the testing device, to determine the actual values/test data of the assets to be tested, are automatically determined by the testing device using the desired end result based on the test requirements, static attributes, and dynamic attributes associated with the closed subset, as will be described below. For example, test parameters may include a magnitude of any or all individual readings, an average of all, or a subset, of the individual readings, etc. of test data, such as a pressure value, an electrical current value, a temperature, and/or a volume, that needs to be achieved/maintained over a certain duration of time, e.g. 100 psi to be held for 2 hours, within the closed subset. In some embodiments, the test parameters may specify minimum or maximum requirements, e.g. values or thresholds, such that a satisfactory result may be any result which meets or exceeds the specified minimum or is less than/less than or equal the specified maximum, e.g. 110 psi was held for 2 hours when the test parameter called for 100 psi to be held for 2 hours, the measured pressure in a closed subset was 98 psi when the test parameter called for a maximum pressure of 100 psi, etc.

An example test procedure may include one or more of the steps of closing particular valves, opening particular breakers, etc. or otherwise ensuring the infrastructure assets to be tested are appropriately isolated, coupling a sensor to a particular asset of the subset under test, introducing a minimum or maximum pressure or current into the subset over a specified period of time, monitoring the pressure or current with the sensor over a specified period of time, etc.

A sensor, such as a thermal sensor, a gas and/or liquid pressure sensor and/or an electrical current or voltage sensor, may be coupled with the closed subset, i.e. to a particular asset of the subset under test, such as a test port, so as to sense and/or measure test data of the closed subset needed for the test, generate an analog or digital signal representative of the test data sensed/measured, and transmit, via a wired and/or wireless medium, the generated signal to the testing device. The testing device monitors, e.g. observes, detects, and/or records, the generated signals as the test is performed, as well as processes, e.g. computes or otherwise derives averages, maximums/minimums, or other derivative or calculated results, etc. thereof, and compares or otherwise assesses the monitored and/or processed signals with/according to the test parameters to make determinations/assessments/conclusions with respect thereto.

In particular, the testing device determines whether or not the test parameters are satisfied/met, e.g. when the measured and/or processed pressure, current, temperature, volume, etc. matches or exceeds the pressure, current, temperature, volume, etc. specified by the test parameters for a certain amount of time as defined by the test parameters, subsequent to or upon the completion of the test. Upon test completion, a test record is created and/or updated, e.g. assembling the data/forming the test record, by the testing device to document that each of the infrastructure assets in the closed subset did or did not meet the specified end result. The testing device assigns the created test record to each of the mapped infrastructure assets that were part of the test. The testing device then stores or causes, as will be described below, the test record to be stored, in a database that is managed/maintained, for example, by the supplier/manufacturer/carrier of the deliverable.

The disclosed embodiments thus facilitate creation of the test record by the testing device, such as through an instance of the app executed thereby. In particular, the disclosed embodiments facilitate creation of the test record for the utility infrastructure without, for example, requiring the user to determine the test parameters and the test procedures and to verify the tested assets that are being tested.

As described generally above and in more detail below, the test record is created, such as by the testing device using an instance of the app executing thereon, by automatically determining the test parameters and in at least one alternative embodiment, the test procedures. The test procedures may be determined as a standardized procedure retrieved from a database of previously designed standardized procedures, as a bespoke compilation/combination of standardized sub-procedures retrieved from a database thereof, and/ or a custom generated procedure. The test parameters and the test procedures are determined before beginning the test and are based on test requirements, static attributes, and/or dynamic attributes associated with the infrastructure assets.

Test requirements include regulatory requirements/government regulations, e.g. test must be performed at 1.5× desired MAOP, industry standards, e.g. tests performed with air must not exceed 1.1× the Design Pressure, a company policy, e.g. tests over 100 psi must be at least 60 minutes in length, or other basis, e.g. manufacturer guidelines/recommendations, or combination thereof. The test requirements may be sent to the testing device, e.g. included in the work order or engineering design, or determined by the testing device, e.g. from a database stored in a memory of the testing device or stored in a remote database coupled therewith.

Static attributes associated with the infrastructure assets include attributes that do not change, such as a permanent dimension, e.g. a length, a diameter, and/or a wall thickness of a pipe, material or construction of the pipe, yield strength of the pipe, and/or a joint type. Static attributes may include remaining material of something that wears out, such as the remaining wall thickness of a pipe as the pipe ages. Static attributes may also include static environmental attributes such as elevation change over the length of the test, proximity to buildings, railroads, roads, and/or other structures where people congregate, etc.

Dynamic attributes associated with the infrastructure assets include attributes that change and may include attributes that may vary over the duration of the test and/or attributes which are static at the site, e.g. dynamic environmental attributes that may vary from site to site, such as ambient air temperature, humidity, air pressure, etc., surface temperature of the infrastructure asset, temperature of testing medium, etc. Dynamic attributes may include remaining material of something that wears out or is otherwise eroded or consumed, such as the remaining thickness of a pipe, as the asset is used.

The described embodiments may be used to create a test record for a variety of utility infrastructures, such as electricity, natural gas, water, sewage, telephone, internet, etc. However, these embodiments could be easily adapted to other types of systems and are not limited to utility infrastructures. The test record may be created during installation and/or maintenance of the utility infrastructure assets. The created test record may update or replace all or part of a previously created test record and/or data entered by a user.

Herein, the phrase "coupled with" is defined to mean directly connected to or indirectly connected through one or more wired and/or wirelessly connected intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group including A, B, . . . and N, that is to say, any combination of one or more of the elements A, B, . . . or N including any one element alone or in combination with one or more of the other elements which may also include, in combination, additional elements not listed.

FIG. 1A depicts an example utility infrastructure 100 that a test record may be created for according to the enclosed embodiments. In this example, the system provides a natural gas service. The infrastructure 100 includes a source 102, such as a compressor station, processing plant, etc. The source 102 provides natural gas to destinations 104, e.g. houses, places of business, etc., using infrastructure assets, such as pipes 106 and valves 108 (not shown in FIG. 1A for clarity) that are divided into a number of subsets 110. In addition, various other assets may be used to deliver the natural gas.

Figure 1B:
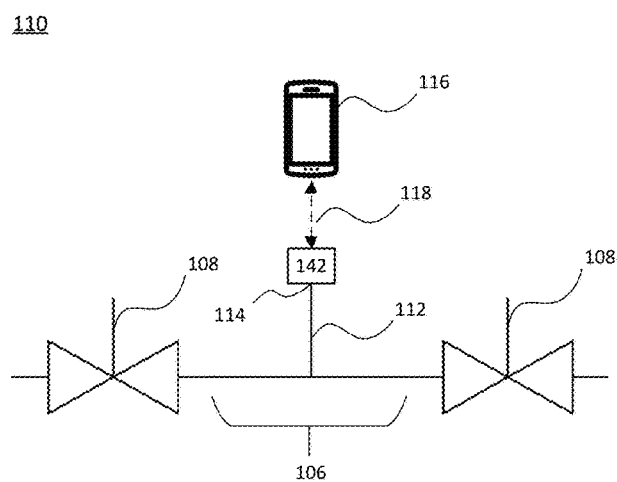
FIG. 1B depicts an example subset of the utility infrastructure of FIG. 1A.

FIG. 1B depicts an example of a subset 110 of the infrastructure 100 to be tested. In this example, the subset 110 is a closed subset, as described above. The subset 110 may be identified to be tested by a work order received by the testing device 116, e.g. on a GIS map. Additionally or alternatively, the field employee may identify and/or confirm the infrastructure assets of the subset 110 to be tested. For example, before beginning the test, the field employee scans a barcode (not shown) on the infrastructure assets to be tested in the subset 110, e.g. the pipe 106 in the subset 110 and the valves 108 in the subset 110. The barcode identifies the asset, e.g. a part/serial number, and may include one or more of the static attributes of the assets, e.g. the pipe 106 in the subset 110 has a 2-inch diameter, ¼ inch wall thickness, 20-foot length, and is made of steel. Additionally or alternatively, the static attributes may be retrieved by the testing device 116 from a remote server, database or data structure, e.g. a website, structured database such as Oracle or SQL, blockchain data structure, etc. Additionally or alternatively, the field employee may walk to each end point/boundary of the assets to be tested, e.g. the two valves 108, while the testing device and/or a device in communication with the testing device tracks the user via GPS. Additionally or alternatively, the field employee may manually enter the assets to be tested, e.g. a part/serial number, a stock keeping unit (SKU) number, etc., and/or identify the assets on a GIS map using the testing device and/or a device in communication with the testing device. Accordingly, the determining of the static attributes and the mapping may be done simultaneously.

The subset 110 is tested by a sensor 142. In this example the sensor 142 may be a pressure sensor and/or a temperature sensor. The sensor 142 is configured to measure test data in the subset 110 and is coupled to an inspection pipe 112, e.g. directly coupled at an open end 114 of the inspection pipe 112, disposed within the inspection pipe 112, attached, or otherwise in contact with, an outside surface of the inspection pipe 112, and/or at a distance from the inspection pipe 112, such as measuring a surface temperature of the inspection section pipe using a non-contact infrared temperature transmitter. The inspection pipe 112 may be another section of pipe, a threaded pipe connector, etc. Alternatively, the subset 110 may not have an inspection pipe 112 and is coupled to/disposed within/at a distance from/attached on an outer surface of the pipe 106 in the subset 110 and/or one or both of the valves 108 in the subset 110. The sensor 142 communicates 118 measured test data with the testing device 116, e.g. wired or wirelessly, as will be discussed in more detail below.

Figure 2A:
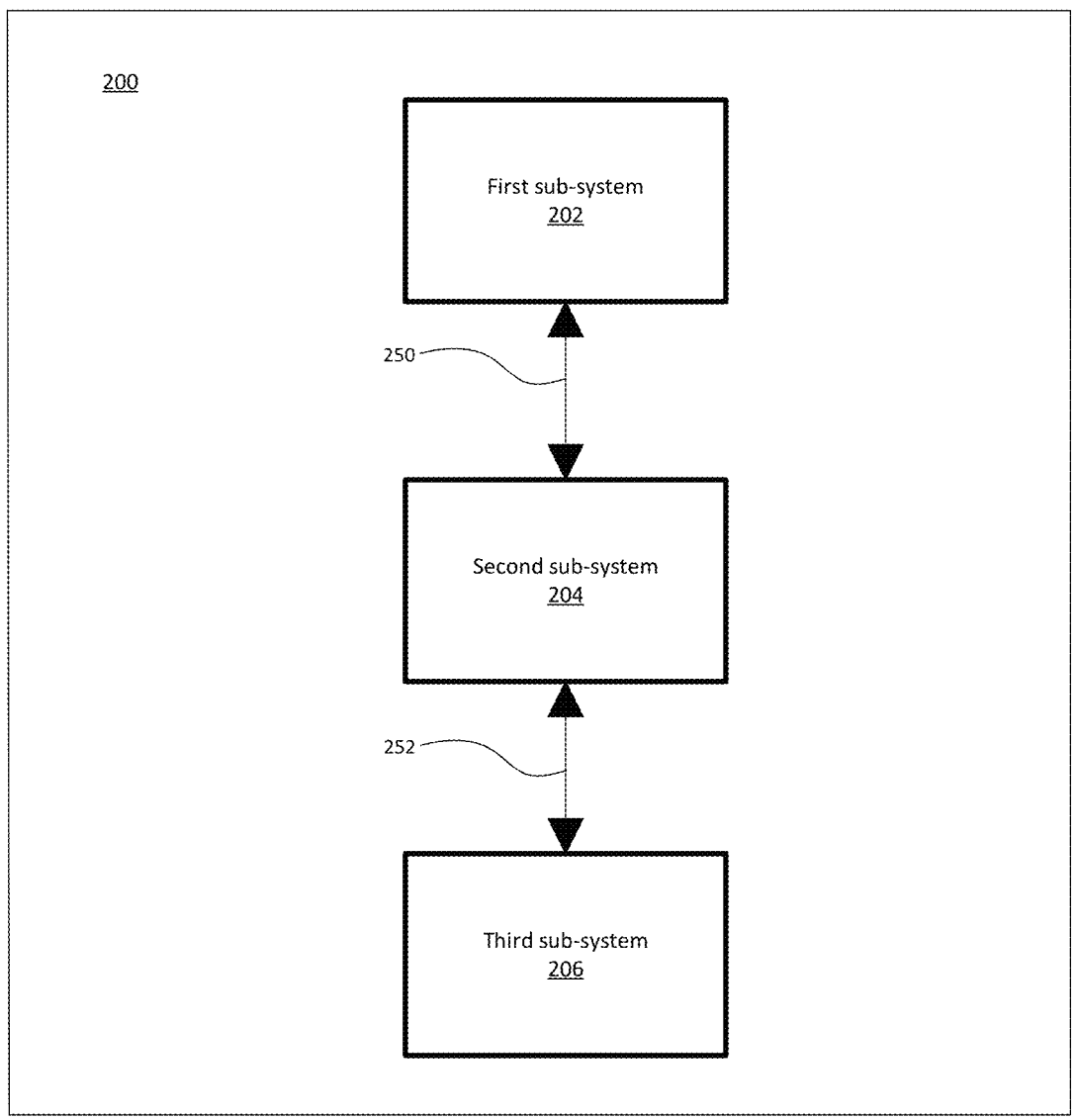
FIG. 2A depicts a system for automatically creating a test record for the subset of the utility infrastructure of FIG. 1B that may be used to implement aspects of the disclosed embodiments.

FIG. 2A depicts a system 200, according to one embodiment, for creating a test record for the subset 110 of the natural gas utility infrastructure 100 of FIG. 1B. The disclosed embodiments are preferably implemented with computer devices and computer networks, such as those described below with respect to FIG. 4 and improved as described herein, that allow for automated testing of utility infrastructure assets. It will be appreciated that the plurality of entities utilizing the disclosed embodiments may be referred to by other nomenclature reflecting the role that the particular entity is performing with respect to the disclosed embodiments and that a given entity may perform more than one role depending upon the implementation and the nature of the particular action being undertaken, as well as the entity's contractual and/or legal relationship with another participant and/or the system 200.

In particular, FIG. 2A depicts a block diagram of a system 200, which may also be referred to as an architecture, for creating a test record for a utility infrastructure. The system 200 may be functionally referred to or otherwise described as including several sub-systems, i.e., a first sub-system 202, a second sub-system 204, and a third sub-system 206, which interact as described herein to achieve the described functionality. The first sub-system 202 and the second sub-system 204 and the second sub-system 204 and the third sub-system 206 communicate via wired or via wireless communication 250, 252, as will be described. It will be appreciated that, depending upon the implementation, the system 200 may, in fact, be implemented with fewer or more sub-systems, and/or a given device may be a part of one or more of the sub-systems 202, 204, 206, e.g. the testing device may be the testing device and measure test data as the sensor device, etc.

Figure 2B:
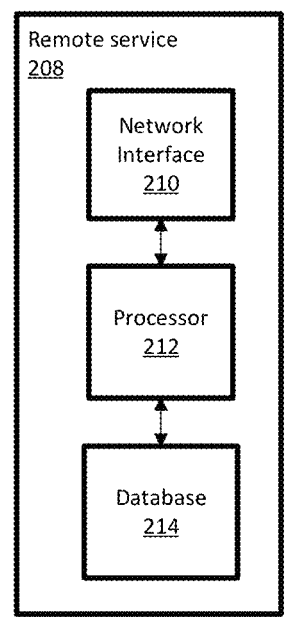
FIG. 2B shows a more detailed diagram of the first sub-system shown in FIG. 2A according to one embodiment.

FIG. 2B shows an example of the first sub-system 202 for the system 200 of FIG. 2A, which, in one embodiment, may be implemented by a server or other computer, such as a cloud computing service. In this embodiment, data indicative of a specification of an end result of a test for the infrastructure assets, may be provided by a service 208 implemented by the first sub-system 202 for the creation of a test record. In one embodiment, the first sub-system 202, and/or service 208 implemented thereby, includes at least one processor 212, at least one database 214 coupled with the at least one processor 212 and at least one network interface 210 coupled with the at least one processor 212 and/or at least one database 214.

Figure 2C:
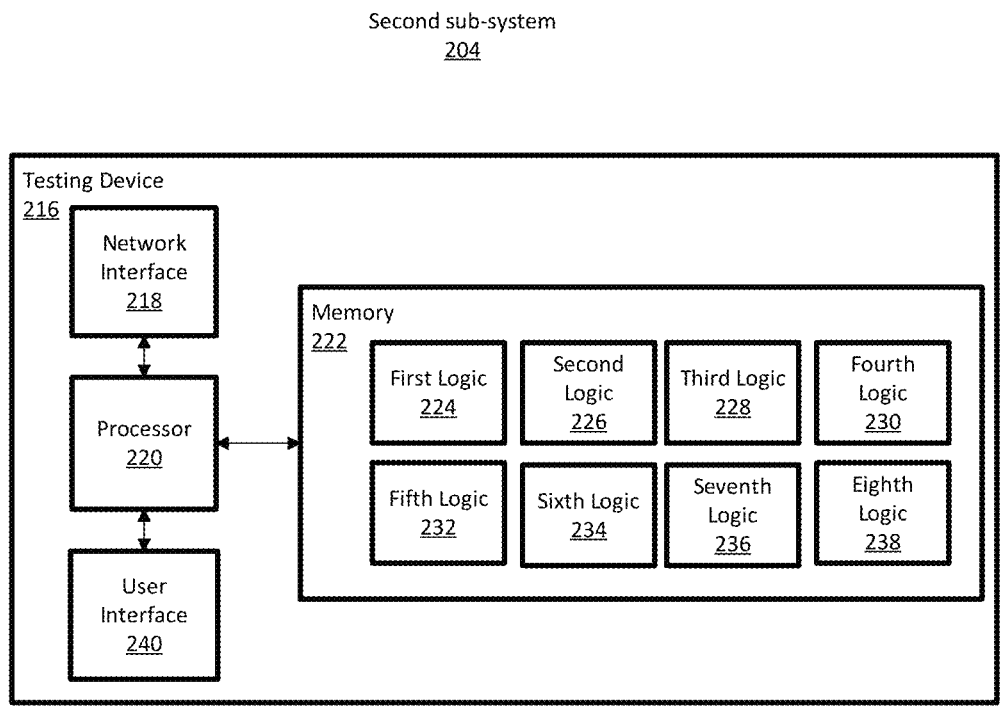
FIG. 2C shows a more detailed diagram of the second sub-system shown in FIG. 2A according to one embodiment.

FIG. 2C shows an example of the second sub-system 204 for the system 200 of FIG. 2A, which, in one embodiment, may be implemented by one or more testing devices operating, as described, to create one or more test parameters and one or more test procedures using the data provided by the service 208 through wired or wireless communication 250. Each testing device 216 includes a processor 220, a memory 222 coupled with the processor 220, a network interface 218 coupled with the processor 220 and/or memory 222, and a user interface 240 coupled with the processor 220 and/or memory 222.

Figure 2D:
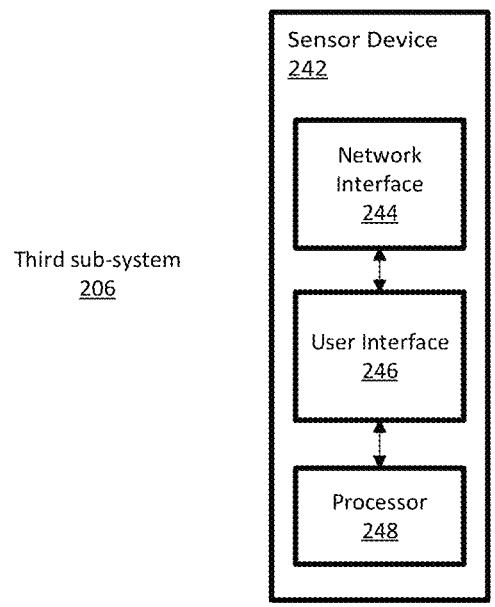
FIG. 2D shows a more detailed diagram of the third sub-system shown FIG. 2A according to one embodiment.

FIG. 2D shows an example of the third sub-system 206 for the system 200 of FIG. 2A which, in one embodiment, may implemented by one or more sensor devices operating, as described, to sense test data, generate a signal representative of the sensed test data, and transmit the generated signals to the second sub-system 204 via wired or wireless communications 252. Each sensor device 242 includes a processor 248, a network interface 244 coupled with the processor 248. The sensor device 242 may further include a user interface 246 coupled with the processor 248 and/or network interface 244.

Referring to FIGS. 2A-D, the second sub-system 204 may further include computer program logic 224, which may be referred to herein as first computer program logic 224, stored in the memory 222 of the testing device 216 and executable by the processor 220 of the testing device 216 to cause the processor 220 to receive, via the network interface 218 of the testing device 216, receive data indicative of a specification of an end result of a test for the plurality of the interconnected components from the service 208. The data may be sent from the processor 212 of the service 208 using the network interface 210 of the service 208 coupled to the processor 212. The data being communicated via an electronic communications network, such as the internet via an app and/or process management software stored in the memory 222 of the testing device 216 and executable by the processor 220 of the testing device.

The receiving of the data may be initiated by the field employee (not shown) inputting a command with the user interface 240 of the testing device 216.

The second sub-system 204 may further include computer program logic 226, which may be referred to herein as second computer program logic 226 and, depending upon the implementation, may be part of the computer program logic discussed above or otherwise coupled therewith, stored in the memory 222 of the testing device 216 and executable by the processor 220 of the testing device 216 to cause the processor 220 to map the assets to be tested.

In one embodiment, the mapping includes locating the assets physically (scanning the barcode as discussed above), geographically (using GPS as discussed above), and/or logically (identifying each asset of the subset as well as the relationship of each asset to the other assets of the subset as described above).

The system 200 further includes computer program logic 228, which may be referred to herein as third computer program logic 228 and, depending upon the implementation, may be part of the computer program logic discussed above or otherwise coupled therewith, stored in the memory 222 of the testing device 216 and executable by the processor 220 of the testing device 216 to cause the processor 220 to determine one or more test requirements, one or more static attributes, and one or more dynamic attributes associated with the infrastructure assets included in a subset of the infrastructure assets to be tested. The subset includes at least a closed subset of the infrastructure assets. The processor 220 of the testing device 216 may initiate an action, by the processor 220 and/or the field employee, to determine the closed subset of the infrastructure assets to test when the data is received by the processor 220. Additionally or alternatively, the closed subset is specified by the data from the service 208.

In one embodiment, the closed subset of the infrastructure assets includes the entire infrastructure 100 of FIG. 1A.

In another embodiment, the one or more test requirements include a government regulation, an industry standard, manufacturer guideline, and/or a company policy.

In another embodiment, the one or more static attributes include one or more permanent dimensions of the assets, e.g. yield strength, material type, and/or static environmental attributes, e.g. elevation change over the length of the test, proximity to buildings, proximity to a railroad, etc.

In another embodiment, the one or more dynamic attributes include one or more dynamic environmental attributes, one or more temperatures of the assets, and/or a temperature of the testing medium. Dynamic environmental attributes include, for example, ambient air temperature, humidity, air pressure, etc.

The second sub-system 204 may further include computer program logic 230, which may be referred to herein as fourth computer program logic 230 and, depending upon the implementation, may be part of the computer program logic discussed above or otherwise coupled therewith, stored in the memory 222 of the testing device 216 and executable by the processor 220 of the testing device 216 to cause the processor 220 to automatically determine one or more test parameters and one or more test procedures for the test based on at least the specified end result, the one or more test requirements, the one or more static attributes, and the one or more dynamic attributes.

In one embodiment, one or more test parameters include the test data that needs to be at least met and a period of time that the test data needs to be met, e.g. 90 psi for 1 hour.

In another embodiment, the one or more test procedures include the steps for conducting the test, e.g. close valves 1, 2, 3, etc. apply 4 psi to the open end 114 of the subset 110 of FIG. 1B for 10 minutes.

The second sub-system 204 may further include computer program logic 232, which may be referred to herein as fifth computer program logic 232 and, depending upon the implementation, may be part of the computer program logic discussed above or otherwise coupled therewith, stored in the memory 222 of the testing device 216 and executable by the processor 220 of the testing device 216 to cause the processor 220 to receive and monitor a signal representative of the test data as the test is performed. The sensor device 242 is coupled with the subset of the infrastructure assets and is operative to sense the test data thereof. The signal is generated by the processor 248 of the sensor device 242. The signal is conveyed or otherwise transmitted or communicated to the processor 220 of the testing device 216 via the network interface 244 of the sensor device 242 and the network interface 218 of the testing device 216. The conveyance of the signal is performed wired or wirelessly, e.g. via the electronic communications network through local private device-to-device communications, such as over a local Wi-Fi network or via NFC or Bluetooth Low Energy. Alternatively, the test data sensed by the sensor device 242 may be displayed to, or otherwise stored for, the field employee. In this example, the field employee would convey the test data by manually entering the test data into the testing device 216 or otherwise conveying the stored data thereto.

In one embodiment, the sensor device 242 further includes an analog to digital converter (not shown) that is coupled to the network interface 244, the user interface 246, and/or the processor 248. The converter is operative to convert the generated signal to digital data representative thereof.

In one embodiment, the test data includes a pressure, a temperature, and/or a current of the subset and/or one or more of the assets in the subset to be tested.

In another embodiment, the sensor device 242 is a pressure sensor, e.g. liquid and/or gas.

In another embodiment, the sensor device 242 is a temperature sensor, e.g. a thermometer.

In another embodiment, the sensor device 242 is an electrical current sensor, e.g. an ammeter.

In an embodiment, the second sub-system 204 may further include computer program logic 234, which may be referred to herein as sixth computer program logic 234 and, depending upon the implementation, may be part of the computer program logic discussed above or otherwise coupled therewith, stored in the memory 222 of the testing device 216 and executable by the processor 220 of the testing device 216 to cause the processor 220 to determine that the specified end result is achieved when, subsequent to completion of the test, the one or more test parameters are at least met.

In an embodiment, the determining that the specified end result is achieved further includes comparing, by the processor 220 of the testing device 216, the generated signal representative of the test data sensed by the sensor device 242 to the one or more test parameters determined by the testing device 216. The one or more test parameters are determined to be at least met when the generated signal representative of the test data sensed by the sensor device 242 is within a threshold of the one or more test parameters for a period of time defined by the one or more test parameters, e.g. 100 psi to be held for 24 hours within 10 psi.

In an embodiment, the second sub-system 204 may further include computer program logic 236, which may be referred to herein as seventh computer program logic 236 and, depending upon the implementation, may be part of the computer program logic discussed above or otherwise coupled therewith, stored in the memory 222 of the testing device 216 and executable by the processor 220 of the testing device 216 to cause the processor 220 to create the test record for each of the assets of the tested subset. The created test record may be stored in a memory 222 of the test device 216.

In an embodiment, the second sub-system 204 may further include computer program logic 238, which may be referred to herein as eighth computer program logic 238 and, depending upon the implementation, may be part of the computer program logic discussed above or otherwise coupled therewith, stored in the memory 220 of the testing device 216 and executable by the processor 220 of the testing device 216 to cause the processor 220 to assign the test record to each of the assets of the tested subset.

In an embodiment, the second sub-system 204 may further include computer program logic 250, which may be referred to herein as ninth computer program logic 250 and, depending upon the implementation, may be part of the computer program logic discussed above or otherwise coupled therewith, stored in the memory 220 of the testing device 216 and executable by the processor 220 of the testing device 216 to cause the processor 220 to store, in the database 214 of the service 208, coupled therewith, the test record. The test record may be sent to the database 214 of the service 208 using the network interface 210 of the service 208 and the network interface 218 of the testing device 216 via the electronic communications network.

In another embodiment, the system 200 of FIGS. 2A-2D can be implemented for testing a public service that provides electricity, telecommunications, and/or internet. In this example, the infrastructure 100 of FIG. 1A would be adapted to provide the above-mentioned services, e.g. the valves 108 would be junctions, relays, breakers, etc., the pipes 106 would be electrical cables, fiber-optic cables, etc., the sensor 142 would be an electrical current sensor or a temperature sensor, and the source 102 would be a power plant, internet provider, etc.

Figure 3:
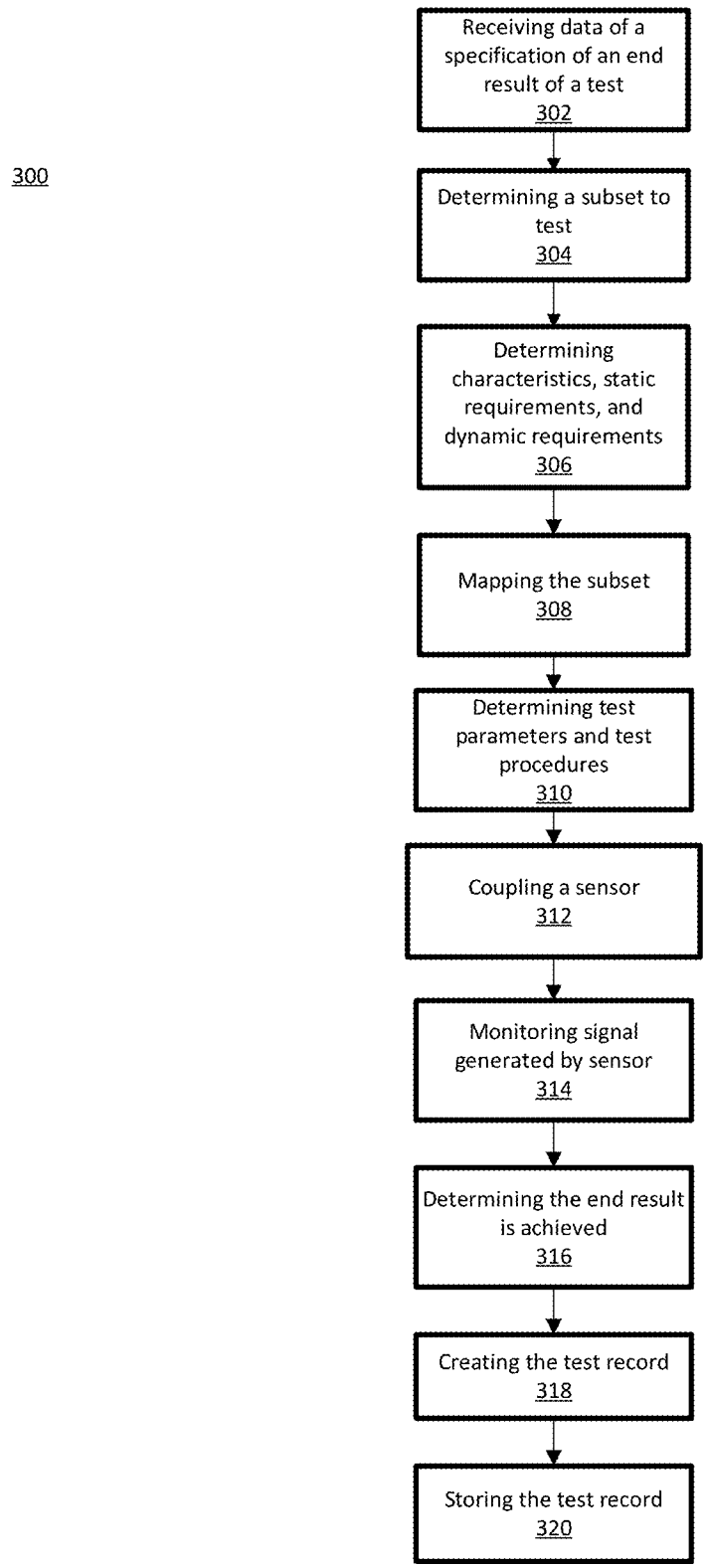
FIG. 3 depicts a flow chart showing operation of the system of FIG. 2.

Referring to FIG. 3, a flow chart showing operation of the system 200 of FIG. 2A-D according to an embodiment is shown. In particular, FIG. 3 shows a computer implemented method for creating a test record for a utility infrastructure. The system 200 includes a service 208, a testing device 216, and a sensor device 242. The service 208 includes a processor 212, a database 214 coupled with the processor 212 and a network interface 210 coupled with the processor 212 and/or database 214. The testing device includes a processor 220, a memory 222 coupled with the processor 220, a network interface 218 coupled with the processor 220 and/or memory 222, and a user interface 240 coupled with the processor 220 and/or memory 222. The testing device 216 further includes computer program logic 224-238, 250 stored in the memory 222 of the testing device 216 and executable by the processor 220 of the testing device 216. The sensor device 242 includes a processor 248, a network interface 244 coupled with the processor 248, and a user interface 246 coupled with the processor 248 and/or network interface 244.

The operation of the system 200 includes: receiving, by a processor 220 of the testing device 216, data indicative of a specification of an end result of a test for the infrastructure assets [Block 302]; mapping, by the processor 220 of the testing device 216, a subset of the infrastructure assets to be tested [Block 304]; determining, by a processor 220 of the testing device 216, one or more test requirements, one or more static attributes, and one or more dynamic attributes associated with the subset to be tested [Block 306]; determining, automatically by the processor 220 of the testing device 216, one or more test parameters and one or more test procedures for the test based on at least the one or more test requirements, the one or more static attributes, and the one or more dynamic attributes [Block 308]; coupling a sensor with the subset, the sensor operative to sense the test data thereof, generate a signal representative of the sensed test data, and transmit the generated signal to the processor 220 of the testing device 216 via a wired connection or via the electronic communications network [Block 310]; monitoring, by the processor 220 of the testing device 216, the generated signal as the test is performed [Block 312]; determining, by the processor 220 of the testing device 216, that the specified end result is achieved when, subsequent to completion of the test, the one or more test parameters are at least met [Block 314]; creating, by the processor 220 of the testing device 216, the test record for each of the infrastructure assets in the tested subset [Block 316]; assigning, by the processor 220 of the testing device 216, the test record to each of the infrastructure assets in the tested subset [Block 318]; and storing, by the processor 220 of the testing device 216 in a database 214 of the service 208 wire or wirelessly coupled via the electronic communications network, the test record [Block 320].

An embodiment of determining one or more test parameters and one or more test procedures using the system 200 from FIGS. 2A-D is described herein.

In one embodiment, the system 200 determines the one or more test parameters and one or more test procedures according to an algorithm, which is based on 49 CFR Part 192, Subpart J, and ASME B31.8: Gas Transmission and Distribution Piping Systems, and outputs the duration of the test, minimum test pressure, maximum test pressure, and/or the requirement for an engineer to apply special considerations, such as determining that the test must be performed in shorter segments, compensating for temperature fluctuations and variations throughout the test, and/or applying different min/max test pressures and test durations. Since the algorithm is based on regulations that may be changed in the future, one who is skilled in the art will appreciate that the algorithm and the corresponding outputs are implementation dependent and may also change accordingly. The algorithm inputs include:

Line Type—transmission, main, service
Maximum Allowable Operating Pressure (MAOP)—any positive number measured in psig, such as 1,000 psig
Maximum Operating Pressure (MOP)—any positive number measured in psig, such as 1,000 psig
Operating Pressure—any positive number measured in psig, such as 500 psig
Design Pressure—any positive number measured in psig, such as 500 psig
Class Location—1, 2, 3, 4
Division—1,2
Specified Minimum Yield Strength (SMYS)—any positive number measured in psi, such as 52,000 psi
Hoop Stress—any positive number measured in psig
Hoop Stress—as a % of SMYS %, such as 72% of SMYS
Protective Coating—yes, no
Material—steel, plastic, etc.
Test Medium—water, gas, air
Temperature of Medium—degrees F.
Temperature of Material—degrees F.
Temperature of Hydrostatic Design Basis (HDB)—degrees F.
Elevation change—feet, such as 120 ft of elevation change from the beginning segment to the ending segment of the pipe to be tested (Note, this list includes inputs that might only be applicable for a certain type of infrastructure asset (e.g. plastic pipe) and would not be applicable to another type of infrastructure asset (e.g. steel pipe).

The algorithm is as follows:

Hoop Stress is exerted circumferentially (perpendicular both to the axis and to the radius of the object) in both directions on every particle in the cylinder wall. Hoop Stress as a percentage of SMYS may be used to determine the duration of a test. For example, if Hoop Stress is greater than 30% SMYS then Duration of the test equals 8 hours.

The Line Type, Operating Pressure, and/or Material Type also may be used to determine the duration of the test. As shown above, the Line Type may be transmission, main, or service. Transmission means a pipeline, other than a gathering line, that: (1) transports gas from a gathering line or storage facility to a distribution center, storage facility, and/or large volume customer that is not down-stream from a distribution center; (2) operates at a hoop stress of 20 percent or more of SMYS; or (3) transports gas within a storage field. Main means a distribution line that serves as a common source of supply for more than one service line. Service means a distribution line that transports gas from a common source of supply to an individual customer, to two adjacent or adjoining residential or small commercial customers, or to multiple residential or small commercial customers served through a meter header or manifold. A service line ends at the outlet of the customer meter or at the connection to a customer's piping, whichever is further downstream, or at the connection to customer piping if there is no meter. For example, if Line Type does not equal service, Material Type does not equal plastic, and Hoop Stress is less than 30% or Operating Pressure is greater than 100 psig then Duration of the test equals 1 hour.

The change in elevation of the line may cause Special Consideration. For example, if Line Type equals transmission and Elevation Change is greater or equal to 100 feet then Special Consideration.

In another example, if Line Type equals main, Material Type equals steel, and Hoop Stress is less than 30% or Operating Pressure is greater than or equal to 100 psig then Duration of the test equals 1 hour.

Line Type, Material Type, Operating Pressure, MOP, and/or Design Pressure may be used to determine the Minimum Test Pressure. For example, if Line Type equals main or transmission, Material Type does not equal plastic, and Operating Pressure is less than 100 psig but greater than 1 psig then Minimum Test Pressure equals 90 psig or Design Pressure, whichever is greater.

In another example, if Line Type equals main or transmission, Material Type does not equal plastic, and Operating Pressure is less than 1 psig then Minimum Test Pressure equals 10 psig.

In another example, if Line Type equals service, Material Type does not equal plastic, and Operating Pressure is less than 40 psig but greater than 1 psig then Minimum Test Pressure equals 50 psig.

In another example, if Line Type equals service, Material Type does not equal plastic, and Operating Pressure is greater than 40 psig then Minimum Test Pressure equals 90 psig.

In another example, if Material Type equals plastic then Minimum Test Pressure equals 1.5 times MOP or 50 psig, whichever is greater.

The Temperature of Material may cause Special Consideration. For example, if Material Type equals plastic and Temperature of Material is greater than or equal to 100 degrees Fahrenheit then Special Consideration.

Temperature of Material compared to Temperature of HDB may cause Special Consideration. For example, if Material Type equals plastic and Temperature of Material is greater than or equal to Temperature of HDB then Special Consideration.

Material Type and Design pressure may be used to determine the Maximum Test Pressure. For example, if Material Type equals plastic then Maximum Test Pressure equals 3 times Design Pressure.

Hoop Stress, Class Location, Divisions, and Medium may also be used to determine the Minimum Test Pressure. Class 1 Location is an offshore area or any class location unit that has 10 or fewer buildings intended for human occupancy. Offshore means beyond the line of ordinary low water along that portion of the coast of the United States that is in direct contact with the open seas and beyond the line marking the seaward limit of inland waters. Class 2 location is any class location unit that has more than 10 but fewer than 46 buildings intended for human occupancy. Class 3 Location is any class location unit that has 46 or more buildings intended for human occupancy except when a Class 4 prevails. Class 4 location is any class location unit where buildings with four or more stories above ground are prevalent, where traffic is heavy or dense, and where there may be numerous other utilities underground. Class 1, Division 1 is a Class 1 Location where the design factor, F, of the pipe is greater than 0.72 but equal to or less than 0.80 and which has been hydrostatically tested to 1.25 times the maximum operating pressure. Class 1, Division 2 is a Class 1 location where the design factor, F, of the pipe is equal to or less than 0.72, and which has been tested to 1.1 times the maximum operating pressure. For example, if Line Type equals transmission or main, Material does not equal plastic, Hoop Stress is greater than or equal to 30%, Class Location equals 1, Division equals 1, and Medium equals water then Minimum Test Pressure equals 1.25 times MOP.

In another example, if Line Type equals transmission or main, Material does not equal plastic, Hoop Stress is greater than or equal to 30%, Class Location equals 1, Division equals 2, and Medium equals water then Minimum Test Pressure equals 1.1 times MOP.

In another example, if Line Type equals transmission or main, Material does not equal plastic, Hoop Stress is greater than or equal to 30%, Class Location equals 1, Division equals 2, and Medium equals air then Minimum Test Pressure equals 1.1 times MOP.

In another example, if Line Type equals transmission or main, Material does not equal plastic, Hoop Stress is greater than or equal to 30%, Class Location equals 1, Division equals 2, and Medium equals air then Maximum Test Pressure equals 1.1 times Design Pressure.

In another example, if Line Type equals transmission or main, Material does not equal plastic, Hoop Stress is greater than or equal to 30%, Class Location equals 1, Division equals 2, and Medium equals gas then Minimum Test Pressure equals 1.1 times Design Pressure.

In another example, if Line Type equals transmission or main, Material does not equal plastic, Hoop Stress is greater than or equal to 30%, Class Location equals 2, and Medium equals water then Minimum Test Pressure equals 1.25 times MOP.

In another example, if Line Type equals transmission or main, Material does not equal plastic, Hoop Stress is greater than or equal to 30%, Class Location equals 2, and Medium equals air then Minimum Test Pressure equals 1.25 times MOP.

In another example, if Line Type equals transmission or main, Material does not equal plastic, Hoop Stress is greater than or equal to 30%, Class Location equals 2, and Medium equals air then Maximum Test Pressure equals 1.25 times Design Pressure.

In another example, if Line Type equals transmission or main, Material does not equal plastic, Hoop Stress is greater than or equal to 30%, Class Location equals 3, and Medium equals water then Minimum Test Pressure equals 1.4 times MOP.

In another example, if Line Type equals transmission or main, Material does not equal plastic, Hoop Stress is greater than or equal to 30%, Class Location equals 4, and Medium equals water then Minimum Test Pressure equals 1.4 times MOP.

Line Type, Material, Hoop Stress, Operating Pressure, Medium, and/or Class Location may also be used to determine the Minimum Test Pressure and/or Maximum Test Pressure. For example, if Line Type equals transmission or main, Material does not equal plastic, Hoop Stress is less than 30% or if Operating Pressure is greater than 100 psig, and Class Location equals 1 then Minimum Test Pressure is between 100 psig and 20% Hoop Stress.

In another example, if Line Type equals transmission or main, Material does not equal plastic, Hoop Stress is less than 30% or if Operating Pressure is greater than 100 psig, Class Location equals 2, and Medium equals water then Minimum Test Pressure is 1.25 times MOP.

In another example, if Line Type equals transmission or main, Material does not equal plastic, Hoop Stress is less than 30% or if Operating Pressure is greater than 100 psig, Class Location equals 3, and Medium equals water then Minimum Test Pressure is 1.4 times MOP.

In another example, if Line Type equals transmission or main, Material does not equal plastic, Hoop Stress is less than 30% or if Operating Pressure is greater than 100 psig, Class Location equals 4, and Medium equals water then Minimum Test Pressure is 1.4 times MOP.

In another example, if Line Type equals transmission or main, Material does not equal plastic, Hoop Stress is less than 30% or if Operating Pressure is greater than 100 psig, Class Location equals 2, and Medium equals air then Minimum Test Pressure is between 100 psig and 20% Hoop Stress.

In another example, if Line Type equals transmission or main, Material does not equal plastic, Hoop Stress is less than 30% or if Operating Pressure is greater than 100 psig, Class Location equals 2, and Medium equals air then Maximum Test Pressure is 75% of Hoop Stress.

In another example, if Line Type equals transmission or main, Material does not equal plastic, Hoop Stress is less than 30% or if Operating Pressure is greater than 100 psig, Class Location equals 3, and Medium equals air then Minimum Test Pressure is between 100 psig and 20% Hoop Stress.

In another example, if Line Type equals transmission or main, Material does not equal plastic, Hoop Stress is less than 30% or if Operating Pressure is greater than 100 psig, Class Location equals 3, and Medium equals air then Maximum Test Pressure is 50% of Hoop Stress.

In another example, if Line Type equals transmission or main, Material does not equal plastic, Hoop Stress is less than 30% or if Operating Pressure is greater than 100 psig, Class Location equals 4, and Medium equals air then Minimum Test Pressure is between 100 psig and 20% Hoop Stress.

In another example, if Line Type equals transmission or main, Material does not equal plastic, Hoop Stress is less than 30% or if Operating Pressure is greater than 100 psig, Class Location equals 4, and Medium equals air then Maximum Test Pressure is 40% of Hoop Stress.

In another example, if Line Type equals transmission or main, Material does not equal plastic, Hoop Stress is less than 30% or if Operating Pressure is greater than 100 psig, Class Location equals 2, and Medium equals gas then Minimum Test Pressure is between 100 psig and 20% Hoop Stress.

In another example, if Line Type equals transmission or main, Material does not equal plastic, Hoop Stress is less than 30% or if Operating Pressure is greater than 100 psig, Class Location equals 2, 3, or 4, and Medium equals gas then Maximum Test Pressure is 30% of Hoop Stress.

In another example, if Line Type equals transmission or main, Operating Pressure is less than 100 psig, and Medium equals gas then Minimum Test Pressure equals Operating Pressure.

The presence of a protective coating that might temporarily seal a leak also may be used to determine the Minimum Test Pressure. For example, if Line Type equals transmission or main, Operating Pressure is less than 100 psig, and Protective Coating equals yes then Minimum Test Pressure equals 100 psig.

Figure 4:
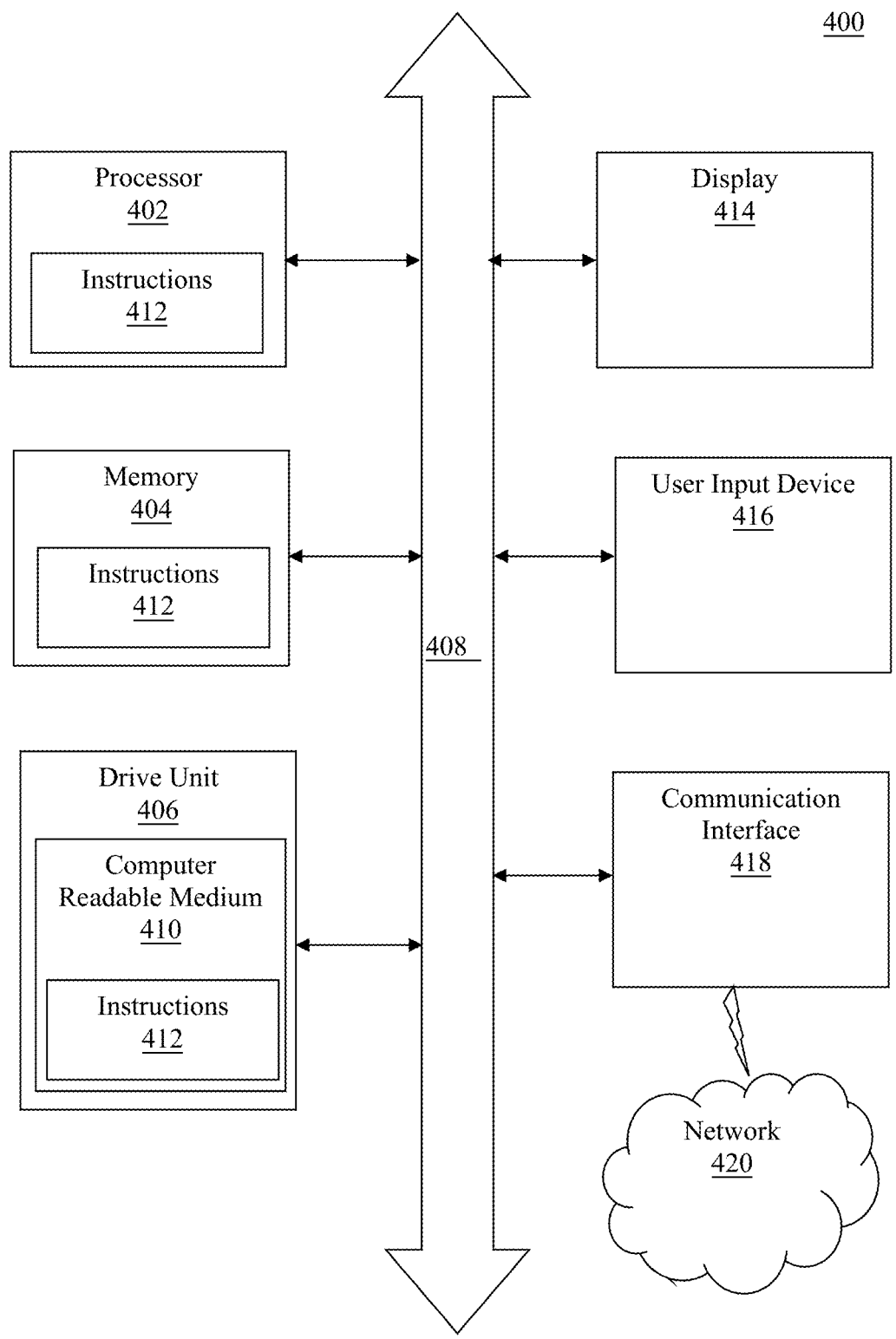
FIG. 4 shows an illustrative embodiment of a general computer system which may be used to implement one or more components of the system of FIG. 2.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using an electronic communications network, to other computer systems or peripheral devices. Any of the components or modules discussed above, such as the processors 212 and 220, may be a computer system 400 or a component in the computer system 400. The computer system 400 may implement the computer implemented system 200 of FIGS. 2A-D and/or the testing device 216.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection or cluster of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, specifically configured processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, solid state drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a non-transitory computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by an electronic communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., an electronic communication network. Examples of electronic communication networks include a local area network ("LAN") and a wide area network ("WAN"), e.g., the Internet.

The computing system can include clients and servers. A client and server are generally remote from each other and typically interact through an electronic communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for creating a test record for a utility infrastructure comprising a plurality of interconnected components which convey a deliverable from at least one source to at least one destination, the method comprising:
   receiving, by a processor, data indicative of a specification of an end result of a test for the plurality of the interconnected components;
   mapping, by the processor, a subset of the plurality of the interconnected components to test, wherein the subset comprises at least a closed subset of the plurality of the interconnected components;
   determining, by the processor, one or more test requirements, one or more static attributes, and one or more dynamic attributes associated with the plurality of the interconnected components included in the subset to be tested;
   determining, automatically by the processor, one or more test parameters and one or more test procedures for the test based on at least the specified end result, the one or more test requirements, the one or more static attributes, and the one or more dynamic attributes;
   coupling a sensor with the subset of the plurality of the interconnected components, the sensor operative to sense test data thereof and generate a signal representative of the sensed test data, and
   conveying the test data sensed by the sensor to the processor;
   monitoring, by the processor, the conveyed test data as the test is performed;
   determining, by the processor, that the specified end result is achieved when, subsequent to completion of the test, the one or more test parameters are at least met;
   creating, by the processor, the test record for each of the plurality of the interconnected components of the tested subset;
   assigning, by the processor, the test record to each of the plurality of the interconnected components of the tested subset; and
   storing, by the processor in a database coupled therewith, the test record.

2. The method of claim 1, wherein the determining that the specified end result is achieved further comprises comparing the test data conveyed to the processor to the one or more test parameters, the one or more test parameters being determined to be at least met when the test data conveyed to the processor is within a threshold of the one or more test parameters for a period of time defined by the one or more test parameters.

3. The method of claim 1, wherein the test data comprises a pressure, a temperature, a current, or a combination thereof.

4. The method of claim 1, wherein the conveying to the processor is via wireless transmission.

5. The method of claim 1, wherein the subset of the plurality of the interconnected components comprises all of the plurality of the interconnected components.

6. The method of claim 1, wherein the sensor comprises an analog to digital converter operative to convert the generated signal to digital data representative thereof.

7. The method of claim 1, wherein the mapping comprises locating the subset of the plurality of the interconnected components physically, geographically, logically, or a combination thereof.

8. The method of claim 1, wherein the plurality of the interconnected components comprises one or more pipes, one or more electrical cables, one or more fiber-optic cables, one or more conduits, one or more valves, one or more junctions, one or more relays, one or more breakers, or a combination thereof.

9. The method of claim 1, wherein the one or more test parameters comprise the test data that needs to be at least met and a period of time that the test data needs to be at least met.

10. The method of claim 1, wherein the one or more test procedures comprise the steps for conducting the test.

11. The method of claim 1, where the sensor comprises a pressure sensor.

12. The method of claim 1, wherein the sensor comprises an electrical current sensor.

13. The method of claim 1, wherein the one or more static attributes comprise one or more permanent dimensions of the plurality of interconnected components.

14. The method of claim 1, wherein the one or more dynamic attributes comprise one or more dynamic environmental attributes, one or more temperatures of the plurality of interconnected components, a temperature of the deliverable, or a combination thereof.

15. The method of claim 1, wherein the one or more test requirements comprise a government regulation, an industry standard, a company policy, or a combination thereof.

16. A system for creating a test record for a utility infrastructure comprising a plurality of interconnected components which convey a deliverable from at least one source to at least one destination, the system comprising:

a memory;

a processor coupled with the memory;

first logic stored in the memory and executable by the processor to cause the processor to receive data indicative of a specification of an end result of a test for the plurality of the interconnected components;

second logic stored in the memory and executable by the processor to cause the processor to map the plurality of the interconnected components included in a subset of the plurality of the interconnected components to be tested, the subset comprising at least a closed subset of the plurality of the interconnected components;

third logic stored in the memory and executable by the processor to cause the processor to determine one or more test requirements, one or more static attributes, and one or more dynamic attributes associated with the plurality of the interconnected components included in the subset of the plurality of the interconnected components to be tested;

fourth logic stored in the memory and executable by the processor to cause the processor to automatically determine one or more test parameters and one or more test procedures for the test based on at least the specified end result, the one or more test requirements, the one or more static attributes, and the one or more dynamic attributes;

fifth logic stored in the memory and executable by the processor to cause the processor to receive and monitor a signal representative of test data as the test is performed, the signal generated and conveyed to the processor from a sensor coupled with the subset of the plurality of the interconnected components and operative to sense the test data thereof;

sixth logic stored in the memory and executable by the processor to cause the processor to determine that the specified end result is achieved when, subsequent to completion of the test, the one or more test parameters are at least met;

seventh logic stored in the memory and executable by the processor to cause the processor to create the test record for each of the plurality of the interconnected components of the tested subset;

eighth logic stored in the memory and executable by the processor to cause the processor to assign the test record to each of the plurality of the interconnected components of the tested subset; and ninth logic stored in the memory and executable by the processor to cause the processor to store, in a database coupled therewith, the test record.

17. The system of claim 16, wherein the determining that the specified end result is achieved further comprises comparing the generated signal representative of the test data sensed by the sensor to the one or more test parameters, the one or more test parameters being determined to be at least met when the generated signal representative of the test data sensed by the sensor is within a threshold of the one or more test parameters for a period of time defined by the one or more test parameters.

18. The system of claim 16, wherein the test data comprises a pressure, a temperature, a current, or a combination thereof.

19. The system of claim 16, wherein the generated signal is conveyed to the processor wirelessly.

20. The system of claim 16, wherein the subset of the plurality of the interconnected components comprises all of the plurality of the interconnected components.

21. The system of claim 16, wherein the sensor comprises an analog to digital converter operative to convert the generated signal to digital data representative thereof.

22. The system of claim 16, wherein the mapping comprises locating the subset of the plurality of the interconnected components physically, geographically, logically, or a combination thereof.

23. The system of claim 16, wherein the plurality of the interconnected components comprises one or more pipes, one or more electrical cables, one or more fiber-optic cables, one or more conduits, one or more valves, one or more junctions, one or more relays, one or more breakers, or a combination thereof.

24. The system of claim 16, wherein the one or more test parameters comprise the test data that needs to be at least met and a period of time that the test data needs to be at least met.

25. The system of claim 16, wherein the one or more test procedures comprise the steps for conducting the test.

26. The system of claim 16, where the sensor comprises a pressure sensor.

27. The system of claim 16, wherein the sensor comprises an electrical current sensor.

28. The system of claim 16, wherein the one or more static attributes comprise one or more permanent dimensions of the plurality of interconnected components.

29. The system of claim 16, wherein the one or more dynamic attributes comprise one or more dynamic environmental attributes, one or more temperatures of the plurality of interconnected components, a temperature of the deliverable, or a combination thereof.

30. A system for creating a test record for a utility infrastructure comprising a plurality of interconnected components which convey a deliverable from at least one source to at least one destination, the system comprising:

means for receiving data indicative of a specification of an end result of a test for the plurality of the interconnected components;

means for mapping the plurality of the interconnected components included in a subset of the plurality of the interconnected components to be tested, the subset comprising at least a closed subset of the plurality of the interconnected components;

means for determining one or more test requirements, one or more static attributes, and one or more dynamic attributes associated with the plurality of the interconnected components included in the subset of the plurality of the interconnected components to be tested;

means for automatically determining one or more test parameters and one or more test procedures for the test based on at least the specified end result, the one or more test requirements, the one or more static attributes, and the one or more dynamic attributes;

means for receiving and monitoring a signal representative of test data as the test is performed, the signal generated and conveyed to the processor by a sensor coupled with the subset of the plurality of the interconnected components and operative to sense the test data thereof;

means for determining that the specified end result is achieved when, subsequent to completion of the test, the one or more test parameters are at least met;

means for creating the test record for each of the plurality of the interconnected components of the tested subset;

means for assigning the test record to each of the plurality of the interconnected components of the tested subset; and means for storing, in a database coupled therewith, the test record.

* * * * *